United States Patent [19]

Melocik et al.

[11] Patent Number: 4,511,947
[45] Date of Patent: Apr. 16, 1985

[54] COIL AND COIL DRIVER CONTROL APPARATUS

[75] Inventors: Grant C. Melocik, Chardon; William Pickering, University Heights, both of Ohio

[73] Assignee: Towmotor Corporation, Mentor, Ohio

[21] Appl. No.: 455,778

[22] Filed: Jan. 5, 1983

[51] Int. Cl.³ .......................................... H01H 47/00
[52] U.S. Cl. ...................................... 361/191; 361/93
[58] Field of Search .................... 361/191, 160, 57, 93, 361/98, 192, 193

[56] References Cited

U.S. PATENT DOCUMENTS 3,466,505  9/1969  Anderson .
3,551,773  12/1970  Dannettell et al. ................. 318/341
4,059,844  11/1977  Stewart ............................ 361/191 X
4,255,775  3/1981  Andrews ........................... 361/191 X

FOREIGN PATENT DOCUMENTS 0030003  6/1981  European Pat. Off. .
1538578  2/1970  Fed. Rep. of Germany ...... 361/191
1360354  5/1964  France .
2246100  4/1975  France .

Primary Examiner—Reinhard J. Eisenzopf
Attorney, Agent, or Firm—Stephen L. Noe

[57] ABSTRACT

Apparatus (10) for monitors and protects a plurality of contactor coils (14A-E) and coil drivers (16A-E) from damage owing to short circuits, and prevents the concurrent energization of more than a preselected number of the coils (14A-E). Included is a monitor (84) for sensing the total current flowing through the plurality of coils (14A-E) and supplying a variable current signal in response to a magnitude of the sensed total current, and a control (85) for receiving the variable current signal and controlling the energization of the coils (14A-E) in response to the magnitude of the current signal. By monitoring and controlling the energization of the plurality of coils (14A-E) damage due to excessive current flow through the coils (14A-E) is avoided and the number of concurrently energized coils (14A-E) is limited to the preselected number.

10 Claims, 4 Drawing Figures

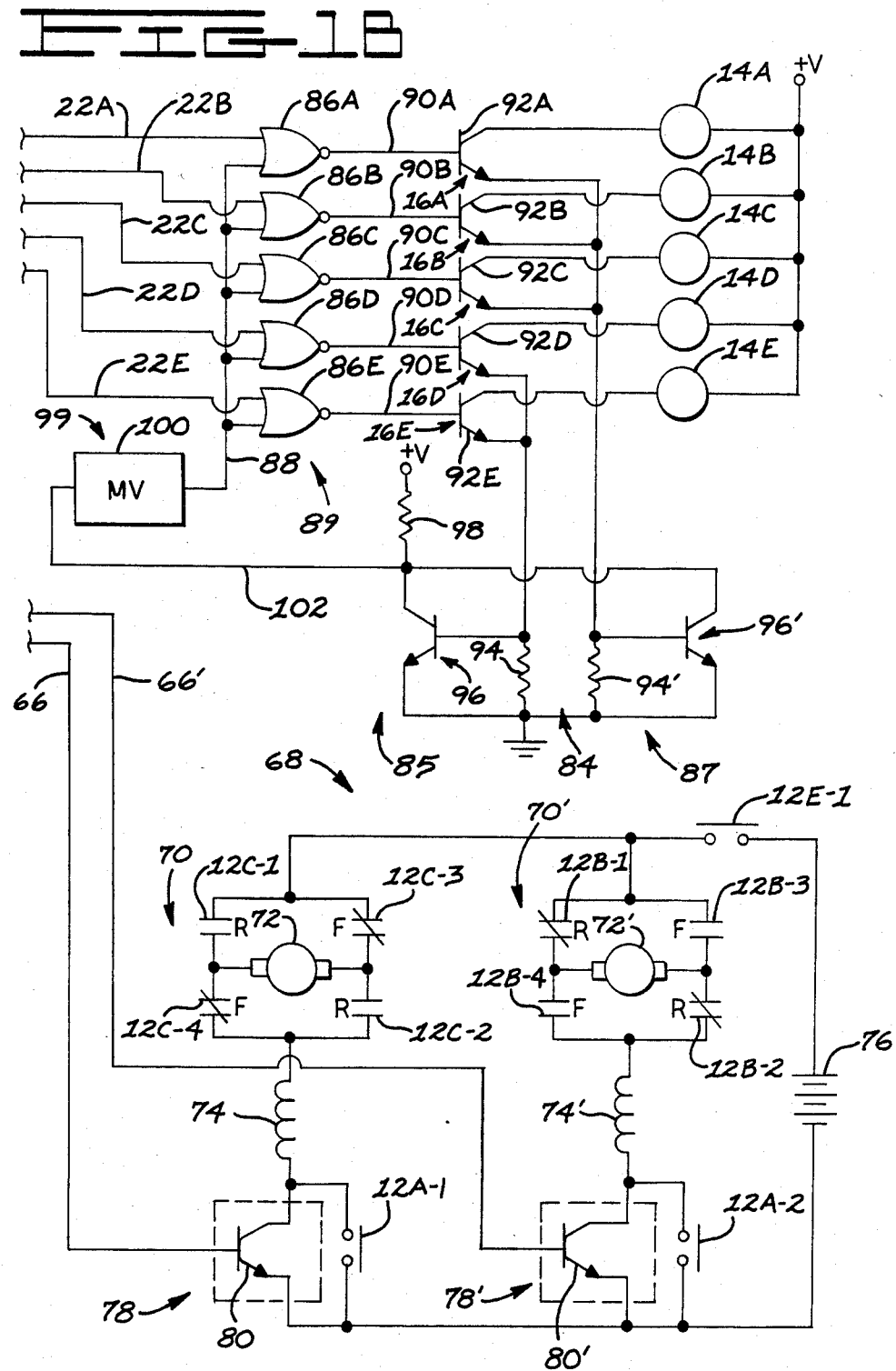

4,511,947

COIL AND COIL DRIVER CONTROL APPARATUS

DESCRIPTION

1. Technical Field

This invention relates generally to contactor control apparatus and, more particularly, to apparatus for controllably limiting the concurrent energization of a plurality of contactor coils to a preselected maximum number and protecting the plurality of coils from damage owing to short circuits.

2. Background Art

Many control circuits have a plurality of energizeable contactor coils which control associated contacts through which electrical power is supplied to respective controlled devices. A plurality of coil drivers respond to respective control signals by closing or opening associated circuit paths to energize or deenergize the contactor coils. The coil drivers typically include transistor switches in series connection with the coils. The transistors are biased "on" and "off" and the coils are responsively energized or deenergized. For example, an electric vehicle typically has a plurality of motors and other devices performing various functions, each device being supplied with power under the control of an associated contactor.

One problem with the above described control circuits is that a short-circuited coil causes excessive current to flow through both the coil and the transistor of the coil driver, causing damage to or failure of the transistor as well as further damage to the coil. Furthermore, a control circuit having a plurality of coils and coil drivers requires protection in the event of a short circuit in any one or more of the coils. A problem exists in conveniently and reliably monitoring and protecting each of the coils and coil drivers simultaneously.

A further deficiency of the above described control circuits is evidenced when it is desired to limit the number of concurrently energized coils to a preselected maximum number. The above circuits make no provision for such limiting control.

The present invention is directed to overcoming one or more of the problems as set forth above.

DISCLOSURE OF THE INVENTION

In one aspect of the present invention, an apparatus has a plurality of controllable contactors, each contactor having an associated coil and coil driver, and means for selectively supplying respective control signals to controllably energize and deenergize each of the coil drivers. The improvement comprises monitoring means for sensing the total current flowing through the plurality of coils and supplying a variable current signal in response to the magnitude of the sensed total current. Control means receive the variable current signal and control the energization of the coils in response to the magnitude of the current signal.

Prior circuits having a plurality of contactor coils and coil drivers are not conveniently and reliably monitored and controlled. The present invention can conveniently and reliably monitor and control any one or more contactor coil and coil drivers.

BRIEF DESCRIPTION OF THE DRAWINGS

For a better understanding of the present invention reference may be had to the accompanying drawings in which:

FIGS. 1A and 1B are a schematic illustration of a control system incorporating an embodiment of the present invention;

BEST MODE FOR CARRYING OUT THE INVENTION

Figure 1A:
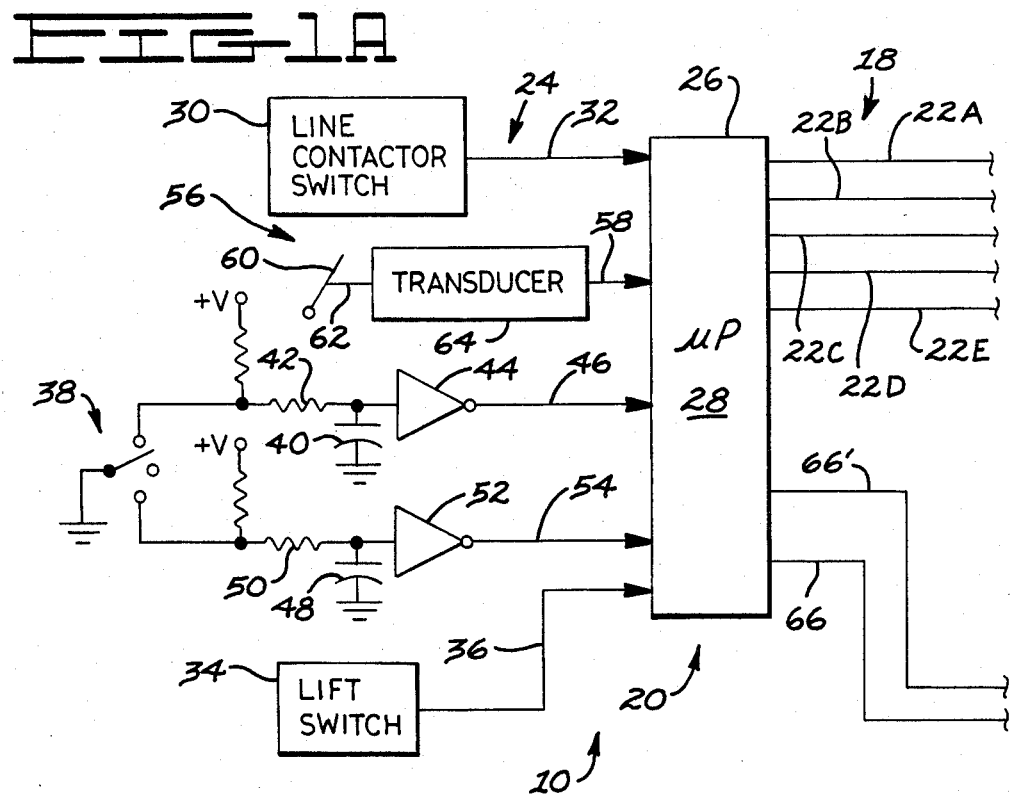
Figure 3:
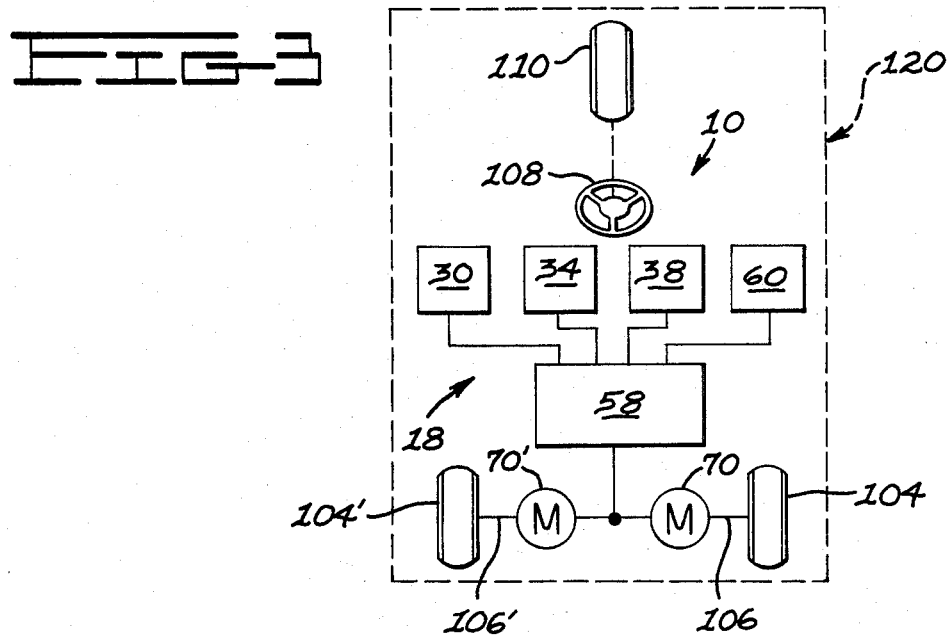
FIG. 3 is a schematized top view of an electric vehicle having the control system of the present invention.

FIGS. 1A and 1B illustrate an apparatus 10 adaptable to be used in, for example, an electric vehicle 120, such as a lift truck, having a plurality of motors 70, 70', and other controlled devices. The apparatus 10 includes a plurality of controllable contactors 12A-12E (12D not shown), associated contactor coils 14A-14E and coil drivers 16A-16E, and a means 18 for selectively supplying respective control signals to controllably energize and deenergize each of the coil drivers 16A-16E.

The means 18 includes means 20 for producing the control signals on the lines 22A-22E, and means 24 for supplying a plurality of logic signals to the means 20. The means 20 advantageously includes a programmable data processing means 26 for producing respective control signals on the lines 22A-22E in response to the logic signals. The data processing means 26 is preferably a software programmable microprocessor 28.

The means 24 includes, for example, a line contactor switch 30 which, when closed, produces a logic 1 signal on a line 32, and, when opened, produces a logic 0 signal on the line 32. The switch 30 is, for example, a conventional key switch, a seat operated switch, or a combination thereof selected to initiate operation of the vehicle 120.

The means 24 additionally includes a lift switch 34 which, when closed and opened, produces respective logic 1 and logic 0 signals on a line 36.

The means 24 also includes a directional control switch 38 having a forward position F, a neutral position N, and a reverse position R. When the switch 38 is in the neutral position N, a capacitor 40 is charged from +V through a resistor 42 to a logic 1 and the output of an inverter 44 on a line 46 is responsively a logic 0, and a capacitor 48 is charged from +V through a resistor 50 to a logic 1 and the output of an inverter 52 on a line 54 is responsively a logic 0.

In response to the directional control switch 38 being switched to the forward position F, the capacitor 40 is discharged through the resistor 42 and the switch 38 to a logic 0 and the output of the inverter 44 on the line 46 is a logic 1. In response to the directional control switch 38 being switched to the reverse position R, the capacitor 48 is discharged through the resistor 50 and the switch 38 and the output on the line 54 from the inverter 52 is a logic 1.

The means 24 further includes a means 56 for generating a plurality of preselected digital numbers representing motor speed commands and supplying the numbers to an output line 58. As one example, the generating means 56 is coupled to an accelerator pedal 60 via a linkage 62. The generating means 56 includes a transducer and signal conditioning circuit 64 which converts positional information of the accelerator pedal 60 to any one of the digital numbers 0000-1111 on the line 58. Each digital number in the range 0000-1111 is a different motor speed command signal. In this example, the number 0000 commands zero speed, the number 1000 commands half speed and the number 1111 commands full or maximum speed. The range of digital numbers from 0000 to 1111 in the binary coded decimal format (BCD) is used only for convenient illustration and could be any suitably coded binary representation, for example, a gray code, having a number of bits consistent with the desired precision.

The logic signals produced by the various elements of the means 24 are delivered via the lines 32,36,46,54,58 to the means 26. The means 26, in response to a preselected set of operating instructions or software, to be further described below, receives the logic signals on the lines 32,36,46,54,58 and responsively produces various control signals on the lines 22A-E and the lines 66, 66'.

In the present example, since there are sixteen digital numbers or command speeds in the range 0000-1111, there are sixteen different preselected motor speed control signals produced by the means 26 on the lines 66, 66'. The signals produced on the lines 66, 66' are pulse trains. Each of the sixteen different pulse trains have a preselected duty factor or proportion of "on-time" to "off-time".

The pulse trains on the lines 66, 66' are delivered to the means 68. The means 68 has motors 70, 70' which are drive motors for the vehicle 120. The motors 70, 70' have armatures 72, 72' and field windings 74, 74'. The means 68 also has a normally open line contact 14E-1 which is responsive to the contactor coil 14-E and couples power from a power source 76, such as a vehicle battery, to the motors 70, 70'.

A pair of normally open reverse contacts 12C-1 and 12C-2 and a pair of normally closed forward contacts 12C-3 and 12C-4 are connected on opposite sides of the armature 72 and are responsive to the contactor coil 14C. A pair of normally closed reverse contacts 12B-1 and 12B-2 and a pair of normally open forward contacts 12B-3 and 12B-4 are connected on opposite sides of the armature 72' and are responsive to the contactor coil 14B.

Also shown are controllable means 78, 78' for coupling power to the motors 70, 70'. The controllable means 78, 78' include power transistors 80, 80' connected in series with the motors 70, 70'. The means 78, 78' receive the signals on the lines 66, 66' and controllably deliver power from the power source 76 to the motors 70, 70' in response to the received signals.

Normally open bypass contacts 12A-1, 12A-2 are connected across the power transistors 80, 80' and pass current around the power transistors 80, 80' in response to a bypass condition described below. The contacts 12A-1, 12A-2 are responsive to the contactor coil 14A.

The contactor coils 14A-E are each controlled by respective coil drivers 16A-E. Each coil driver 16A-E includes an associated transistor switch 92A-E having a collector connected to a first terminal of the respective coil 14A-E. A second terminal of each coil 14A-E is connected to +V. An emitter of each transistor switch 92A-E is connected to the circuit ground via a shunt resistor 94/94'.

The base of each transistor switch 92A-E is connected via a respective line 90A-E to a limiting means 89. The limiting means 89 includes associated NOR gates 86A-E. Each gate includes a first input terminal connected to a control line 88, a second input terminal connected to a respective one of the lines 22A-E, and an output terminal connected to a respective one of the lines 90A-E.

In response to a logic 0 signal on the control line 88 and a logic 0 signal on at least one of the lines 22A-E, the associated NOR gate supplies a logic 0 signal to the base of the respective transistor 92A-E. The transistor 92A-E is biased "on" and enables current to flow from +V through the respective coil 14A-E, transistor 92A-E, and shunt resistor 94/94', to circuit ground, energizing the respective coil 14A-E. Conversely, in response to a logic 1 signal on the control line 88, each of the NOR gates 86A-E supplies a logic 0 signal to the respective coil drivers 16A-E and, in response, the associated coils 14A-E are deenergized.

To summarize, individual "on/off" control of each of the coil drivers 16A-E and associated coils 14A-E is accomplished in response to the state of the logic signals received on the lines 22A-E and to the logic 0 signal being received on the control line 88. Common blocking control of all of the coils 14A-E is accomplished in response to the logic 1 signal being received on the control line 88.

The shunt resistors 94, 94' comprise a monitoring means 84 for sensing the total current flowing through the plurality of coils 14A-E and associated coil drivers 16A-E and supplying a variable current signal in response to the magnitude of the sensed total current.

The monitoring means 84 is part of an overall control means 85 for receiving the current signal and controllably limiting the number of concurrently energized coils 14A-E to a preselected maximum number in response to the magnitude of the current signal. The means 85 also includes a means 87 for supplying a triggering signal in response to the magnitude of the current signal exceeding a preselected value and a means 99 for receiving the triggering signal and supplying a blocking signal in response to receiving the triggering signal.

As one example, a first terminal of the shunt resistor 94 is connected to the emitter of the transistors 92D, E and a first terminal of the shunt resistor 94' is connected to the emitter of the transistors 92A-C. A second terminal of the shunt resistors 94, 94' is connected to circuit ground.

The first terminal of the resistor 94 is additionally connected to the base of a transistor 96. In a like manner, the first terminal of the resistor 94' is additionally connected to the base of a transistor 96'. The emitters of the transistors 96, 96' are connected to circuit ground and the collectors of the transistors 96, 96' are connected to +V through a pull-up resistor 98 and to a trigger input of the means 99, preferably a mono-stable multivibrator 100, via a line 102. An output of the multivibrator 100 is connected to the control line 88.

As is above described, all current flowing through the coils 14A-C and the coil drivers 16A-C necessarily flows through the shunt resistor 94' and all current flowing through the coils 14D,E and the coil drivers 16D,E flows through the shunt resistor 94. The current flowing through the shunt resistors 94, 94' produces a voltage across the shunt resistors 94, 94' and responsively on the respective transistor 96, 96' bases. The transistors 96, 96' are thus biased "on" in response to a relatively high current flow through the respective shunt resistor 94, 94' and "off" in response to a relatively low current flow.

The resistance of the shunt resistors 94, 94' is selected such that the current flow produced by, for example, two of the contactor coils 14A-E being energized does not bias the respective transistor 96, 96' "on", but the increased current flow produced by the addition of a third energized contactor coil 14A-E or by a short circuited coil 14A–E does bias the transistor 96, 96' "on".

The "on-off" condition of the transistors 96, 96' is thus controlled by the level of total current flow through the shunt resistors 94, 94' which is, in turn, responsive to the number and condition of the energized contactor coils 14A–E.

In response to both of the transistors 96, 96' being biased "off" a logic 1 signal is delivered on the line 102 owing to the connection of the pull-up resistor 98 to +V. In response to receiving the logic 1 signal on the line 102 the multivibrator 100 delivers a continuous logic 0 signal on the control line 88 to each of the gates 86A–E.

In response to at least one of the transistors 96, 96' being biased "off" a logic 0 signal is delivered on the line 102 to the multivibrator 100. In response to receiving the logic 0 signal on the line 102 the multivibrator 100 delivers a logic 1 signal via the control line 88 to each of the gates 86A–E for a preselected period.

In response to receiving the logic 1 signal on the line 88, each of the NOR gates is blocked, as described above, from passing the signals on the lines 22A–E and each of the coil drivers 16A–E and respective coils 14A–E is deenergized for at least the preselected period. In response to the coils 14A–E being deenergized, current ceases to flow through the shunt resistors 94, 94', the transistors 96, 96' are biased "off", and the logic 1 signal is delivered to the multivibrator via the line 102. However, according to the conventional design of the monostable multivibrator 100, the logic 1 signal continues to be delivered to the line 88 for the preselected period. Subsequent to the preselected period, the logic 0 signal is again delivered to the line 88 and the gates 86A–E are again enabled to control the energization of the contactor coils 14A–E in response to the signals on the lines 22A–E.

In the case where the condition which causes excessive current flow through the shunt resistors 94, 94' continues to exist, the multivibrator 100 repetitively toggles the NOR gates "off" for the preselected period and prevents operation of the vehicle 120 and further damage to the control system 10. In the case where the condition which causes excessive current flow through the shunt resistors 94, 94' has ceased, the operation of the control system 10 returns to normal at the end of the preselected period.

As one example of the operation of the control system 10, the contactor switch 30 is closed and the microprocessor 28 responds under software control to the resulting logic 1 signal on the line 32 by producing a logic 0 signal on the line 22E. Assuming normal conditions, i.e., a logic 0 signal on the control line 88, the line contactor 12E-1 is energized as previously described.

Continuing the example, the directional control switch 38 is in the forward position F and the microprocessor 28 responds under software control to the logic 1 signal on the line 46 by producing a logic 0 signal on the line 22B, and the NOR gate 86B energizes the contactor coil 14B. The forward contacts 12B-3 and 12B-4 are responsively closed and the forward contacts 12C-3 and 12C-4 remain closed.

Next, the accelerator pedal 60 is depressed to one of a plurality of positions and the means 56 generates the preselected digital number on the line 58. The microprocessor 28, under software control, produces pulse trains on the lines 66, 66' in response to the digital number on the line 58. Responsively, power is coupled from the power source 76 through the closed line contact 12E-1, forward contact 12B-3, armature 72', forward contact 12B-4, field winding 74', transistor 80' and back to the power source 76. Also, power is coupled from the power source 76 through the closed line contact 12E-1, forward contact 12C-3, armature 72', forward contact 12C-4, field winding 74, transistor 80 and back to the power source 76. Thus, the motors 70, 70' are energized to rotate in the forward direction, at the commanded speed.

Similarly, in response to the directional control switch 38 being in the reverse position R, the microprocessor 28 produces a logic 0 on the line 22C, the line 22B reverts to a logic 1, the NOR gate 86C energizes the contactor coil 14C and the NOR gate 86B deenergizes the contactor coil 14B in the manner described above.

The associated contactors are operated to energize the motors 70, 70' to rotate in the reverse direction at the commanded speed.

Assume now that the accelerator pedal 92 is depressed to the full speed position and responsively the number 1111 is on the line 58. The microprocessor 28 responds under software control by producing the logic 0 signal on the line 22A and the bypass contacts 12A-1, 12A-2 are closed. In response, full non-pulsed power is supplied to the motors 70, 70'.

In a similar manner, closing the lift switch 34 causes the microprocessor 28 to respond under software control by producing a logic 0 on the line 22D and energizing the coil 14D and associated contacts (not shown) to energize another motor (not shown) that, for example, lifts a device such as a fork lift or other implement (not shown).

During normal operation of the control system 10, as described above, the total current flowing through the shunt resistors 94, 94' in response to the energization of the coils 14A–E produces a bias voltage on the base of the transistors 96, 96' that is insufficient to turn the transistors 96, 96' "on". Consequently, the line 88 remains at a logic 0 and the NOR gates 86A–E remain enabled.

A short circuit of one or more of the coils 14A–E increases the current flowing through the respective shunt resistor 94, 94' and biases the respective transistor 96, 96' "on". In response, the multivibrator 100 outputs the timed logic 1 signal on the line 88 and the NOR gates 86A–E responsively output the logic 0 signals to each of the transistor 92A–E bases. The coils 14A–E are responsively deenergized, causing the current flowing through the resistors 94, 94' to decay, biasing the transistors 96, 96' "off", and resetting the trigger input of the multivibrator 100 via the logic 1 signal on the line 102.

Following the preselected period of the blocking pulse produced by the multivibrator 100, the control line 88 again delivers the logic 0 signal to each of the NOR gates 86A–E. A continuing short circuit causes repeated iterations of the above described events.

In a like manner, any other occurrence of current flow through the shunt resistors 94, 94' sufficient to bias the transistors 96, 96' "on" results in the production of the logic 1 blocking signal on the line 88. For example, the shunt resistor 94' is selected to bias the transistor 96' "on" in response to the current flow produced by the concurrent energization of each of the coils 14A–C and to bias the transistor 96' "off" in response to the energization of no more than two of the coils 14A–C.

Consequently, concurrent energization of the direction coil 14B and the bypass coil 14A, causing maximum speed operation of the vehicle 120 in the forward direction, does not bias the transistor 96' "on"; nor does concurrent energization of the direction coil 14C and the bypass coil 14A, causing maximum speed operation of the vehicle 120 in the reverse direction, bias the transistor 96' "on". However, concurrent energization of all three of the coils 14A–C, which results in the potentially dangerous situation of maximum speed operation of the vehicle 120 with the wheels 104, 104' counter-rotating, does bias the transistor 96' "on" and results in the above described timed deenergization of each of the coils 14A–E. Other undesirable combinations of concurrently energized coils 14A–E are readily controlled by obvious rearrangement of the embodiment of this invention as taught above and shown in FIG. 1.

Figure 2:
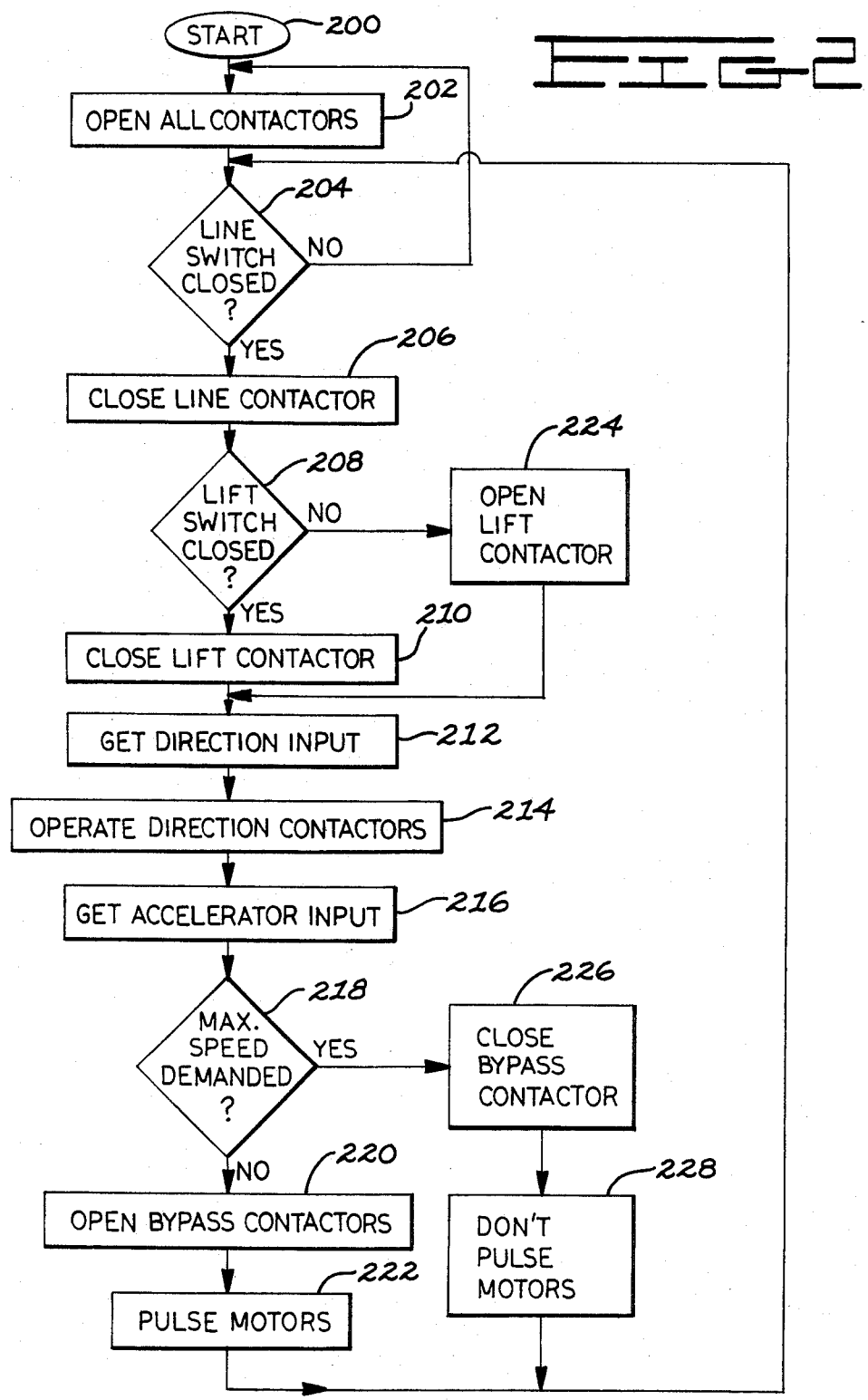
FIG. 2 is a flow chart used to explain the software of the present invention.

FIG. 2 is a flow chart of a computer program suitable for controlling the apparatus 10. Only the software routines required to implement one embodiment of the present invention are described herein. Sufficient detail is presented to allow one skilled in computer programming to write the required program to implement the flow chart for any common microprocessor, for example, the microprocessor produced by MOSTEK Corporation of Carrollton, Tex. and designated by the part number 3870. Upon beginning the flow chart at the block 200 labeled START, program control progresses through the following sequence:

In the block 202 the program routine begins with the contactor coils 14A–E deenergized in response to a logic 1 control signal from the microprocessor 28 on the lines 22A–E. Subsequently, in the block 204, the status of the line switch 30 is determined. If the switch 30 is open, indicating that the vehicle 120 is not to be operated, the program loops back to the block 202. This loop continues until the switch 30 closes, at which time the program proceeds to the block 206, and closes the line contactor 12E-1 with a proper control signal from the microprocessor 28 on the line 22E.

Next, in the block 208, the microprocessor 28 inputs the information received on the line 36 from the lift switch 34. If the lift switch 34 is closed, program control passes to the block 210 where the lift contactor coil 14D is energized, with a proper control signal from the microprocessor 28 on the line 22D. If the lift switch 34 is open, program control passes from the block 208 to the block 224 where the lift contactor coil 14D is deenergized with an appropriate control signal from the microprocessor 28 on the line 22D.

In either event, the block 212 and the microprocessor 28 next inputs the information received on the lines 46,54 in response to the direction switch 38 position. In the block 214 the direction contactor coils 14B, 14C are selectively energized for vehicle 120 operation in the direction selected by the direction switch 38.

Information received on the line 58 relating to the accelerator pedal 60 position or speed demand is next input by the microprocessor 28 in the block 216. If the maximum speed demand accelerator pedal 60 position is not detected in the block 218, program control passes to the block 220. In the block 220 the bypass contactor coil 14A is deenergized with the appropriate control signal from the microprocessor 28 on the line 22A. Finally, in the block 222, the microprocessor 28 determines, in a conventional manner, either by calculation or from a look-up table stored in memory, appropriate pulse train waveforms to output on the lines 66, 66' to operate the vehicle 120 at the speed demanded by the accelerator pedal 60 position. Control is then transferred back to the block 202 for the next program iteration.

If the maximum speed demand accelerator pedal 60 position is detected in the block 218, program control passes to the block 226. In the block 226 the bypass contactor coil 14A is energized with the appropriate control signal from the microprocessor 28 on the line 22A. In response, full non-pulsed power is applied to the motors 70, 70' through the bypass contacts 12A-1, 12A-2 to operate the vehicle 120 at maximum speed, and, in the block 228, the microprocessor 28 ceases to output pulse trains on the line 66, 66'. Control is then transferred back to the block 202 for the next program iteration.

FIG. 4 shows an overall vehicle control system 10 for the vehicle 120, for example, an electric fork lift truck, having a left drive wheel 104 and a right drive wheel 104'. The drive motor 70 rotates the drive wheel 104 through a shaft 106 and the drive motor 70' rotates the drive wheel 104' through a shaft 106'. The means 18 controls the energization and deenergization of the drive motors 70,70' as well as the lift motor (not shown), in the manner previously described, and in response to the position or state of the line contactor switch 30, lift switch 34, directional control switch 38, and accelerator pedal 60. Also shown is a steering wheel 108 and a steerable wheel 110, conventionally used in 3-wheeled vehicles, which control the steering of the vehicle 120.

Industrial Applicability

A vehicle operator typically first closes the line contactor switch 30 and energizes the contact 12E-1. The operator then selects forward or reverse drive by switching the directional control switch 38 into the forward position F or reverse position R. In response, the respective directional contactor coil 14B, 14C is energized to change the state of the contacts 12B-1 through 12B-4 or the contacts 12C-1 through 12C-4, energizing the motors 70, 70' to move the vehicle 120 in the selected forward or reverse direction.

Next, the operator depresses the accelerator pedal 60 to any desired command speed position. As a result, the controllable means 78, 78' are pulsed "on" and "off" and couple power to the motors 70, 70'. Depressing the accelerator pedal 60 to the full speed position causes the bypass contactor coil 14A to be energized, closing the bypass contacts 12A-1, 12A-2 and supplying full power to the motors 70, 70'.

Finally, closing the lift switch 34 results in the microprocessor 28 energizing the lift contactor coil 14A and ultimately causes the lifting of a device such as a fork lift assembly (not shown).

At any time during the operation of the control system 10, should a short circuit occur in one or more of the coils 14A–E, the means 84 functions as previously described to protect the coils 14A–E and coil drivers 16A–E from further damage due to excessive current flow. Thus, if a short circuit occurs involving the line contactor coil 14E or the lift coil 14D, the transistor 96 is biased "on" to generate the logic 0 trigger signal on the line 102, or, if a short circuit occurs involving the directional contactor coil 14C, the directional contactor coil 14B or the bypass contactor coil 14A, the transistor 96' is biased "on" to generate the logic 0 trigger signal on the line 102. Consequently, the logic 1 signal is generated by the multivibrator 100 on the line 88 to deenergize all of the coils 14A–E for the predetermined period.

Likewise, should two of the contactor coils 14A–E which are connected to the same shunt resistor 94,94' be energized, for example the direction contactor coil 14B and the bypass contactor coil 14A, and should an additional contactor coil 14A–E, for example, the direction contactor coil 14C, become energized, the means 84 again functions as previously described to prevent the undesirable energization of the additional coil 14A–E.

In summary, the present invention protects a contactor coil and a corresponding coil driver against damage due to a short circuit by deenergizing the contactor coil in the event of a short circuit. Furthermore, the means 84 constitutes a convenient and reliable way of protecting a plurality of coils and corresponding driver transistors used in one overall system against a short-circuit condition, and of limiting the number of concurrently energized coils to a preselected maximum number.

Other aspects, objects and advantages of the invention can be obtained from a study of the drawings, the disclosure and the appended claims.

We claim:

1. In an apparatus (10) having a plurality of controllable contactors, each contactor having an associated coil (14A–E) and coil driver (16A–E), and means (18) for selectively supplying respective control signals to controllably energize and deenergize each of said coil drivers (16A–E), the improvement comprising:
   monitoring means (84) for sensing the total current flowing through said plurality of coils (14A–E) and supplying a variable current signal in response to the magnitude of said sensed total current; and
   control means (85) for receiving said current signal and controllably limiting the number of concurrently energized coils (14A–E) to a preselected maximum number in response to the magnitude of said current signal.

2. An apparatus (10), as set forth in claim 1, wherein said control means (85) includes means (87) for supplying a triggering signal in response to the magnitude of said current signal exceeding a preselected value.

3. An apparatus (10), as set forth in claim 2, including means (99) for receiving said triggering signal and supplying a blocking signal in response to receiving said triggering signal, said blocking signal having a preselected duration.

4. An apparatus (10), as set forth in claim 3, including limiting means (89) for receiving said control signals and said blocking signals, passing said control signals to respective coil drivers (16A–E) in response to receiving said control signals in the absence of said blocking signal, and blocking each of said control signals from said coil drivers (16A–E) in response to receiving said blocking signal.

5. An apparatus (10) for controlling the operation of a plurality of contactors, each having an associated coil (14A–E) and coil driver (16A–E), comprising:
   means (18) for selectively supplying respective control signals to each of said coil drivers (16A–E);
   monitoring means (84) for sensing the total current flowing through said coils (14A–E) and supplying a blocking signal in response to the magnitude of said total current exceeding a preselected value; and
   limiting means (89) for receiving said control signals and said blocking signal, passing said control signals to respective coil drivers (16A–E) in response to receiving said control signals in the absence of said blocking signal, and blocking each of said control signals from said coil drivers (16A–E) in response to receiving said blocking signal.

6. An apparatus (10), as set forth in claim 5, wherein said blocking signal is a pulse having a preselected time duration.

7. An apparatus (10), as set forth in claim 5, wherein said monitoring means (84) includes a current shunt (94, 94') connected in series with each of said coils (14A–E) and respective coil drivers (16A–E).

8. An apparatus (10), as set forth in claim 5, wherein said limiting means (89) includes a plurality of logic gates (86A–E), each having a first input connected to receive said blocking signal, a second input connected to receive respective control signals, and an output connected to deliver said control signals to respective coil drivers (16A–E).

9. A method for limiting the energization of a plurality of contactor coils (14A–E) to a preselected number, comprising:
   sensing the total current flowing through said plurality of coils (14A–E);
   generating a triggering signal in response to said total current exceeding a preselected value;
   generating a blocking signal in response to receiving said triggering signal, said blocking signal having a preselected time duration; and
   blocking the energization of said coils (14A–E) in response to receiving said blocking signal.

10. Apparatus (10) for controlling a plurality of contactors, each contactor having an associated coil (14A–E) connected to a power source, comprising:
   means (18) for controllably supplying a plurality of respective contactor control signals;
   a plurality of driver transistors (92A–E), each having a collector terminal connected to a respective one of said coils (14A–E), an emitter terminal connected in common with at least one other of said driver transistor emitter terminals, and a base terminal;
   a plurality of shunt resistors (94, 94'), each having a first terminal connected to a respective set of commonly connected emitter terminals, and a second terminal connected to apparatus ground;
   a plurality of triggering transistors (96, 96'), each having a respective base connected to one of said shunt resistor first terminals, an emitter connected to apparatus ground, and a collector connected to said power source;
   a mono-stable multivibrator (100) having an input terminal connected to each of said triggering transistor collector terminals, and an output terminal; and,
   a plurality of logic gates (86A–E), each having a first input terminal connected to said multivibrator output terminal, a second input terminal connected to said supplying means 18, and an output terminal connected to a respective one of said driver transistor base terminals.

* * * * *